United States Patent [19]

Courant

[11] 3,871,404

[45] Mar. 18, 1975

[54] FLUID-TIGHT AND SEPARABLE COUPLING, LIQUID-FILLING DEVICES FOR RESERVOIRS

[75] Inventor: Jacques Courant, Epinay-Sur-Seine, France

[73] Assignee: Societe Zenith-Aviation, Levallois-Perret, France

[22] Filed: Jan. 15, 1974

[21] Appl. No.: 433,476

[30] Foreign Application Priority Data
Feb. 2, 1973 France .............................. 73.03799

[52] U.S. Cl. ........................... 137/614.03, 141/351
[51] Int. Cl. .............................................. F16k 1/00
[58] Field of Search ........................... 141/346–362, 141/367, 368, 382–389, 392; 137/614.01, 614.02, 614.03, 614.05; 251/149, 149.1

[56] References Cited
UNITED STATES PATENTS
2,457,251   12/1948   Main ............................. 137/614.03

*Primary Examiner*—Houston S. Bell, Jr.
*Attorney, Agent, or Firm*—Stevens, Davis, Miller & Mosher

[57] ABSTRACT

The device comprises an element fixed to a reservoir and an element mounted at the end of a delivery pipe, the two elements being normally rendered fluid-tight by valves cooperating with seats. The bringing together of the elements causes the opening of the valves. A spring-urged pusher is mounted on one element so as to cause separation of the latter when the operator ceases to thrust on handles carrying these elements. The invention is particularly applicable to the filling of fuel tanks of racing cars.

8 Claims, 6 Drawing Figures

FLUID-TIGHT AND SEPARABLE COUPLING, LIQUID-FILLING DEVICES FOR RESERVOIRS

BACKGROUND OF THE INVENTION

The invention relates to fluid-tight and separable coupling, liquid-filling devices for reservoirs. It relates more particularly to fixed or movable fuel service stations, especially those intended for the refilling of vehicles, particularly racing cars.

Known filling devices generally ensure a sealed coupling but provide no guarantee against an accident occurring through the carelessness of the operator or any other factor, since the separation of the two elements of the device, borne respectively by the reservoir or tank and by an inlet pipe and often denoted by "tank filler opening" and "filler nozzle", generally require manual intervention by the operator which, however easy is none-the-less always necessary to ensure 100% correct functioning, without loss of liquid in any circumstances, including the phases of coupling and uncoupling.

It is an object of the invention to provide a filler device which eliminates the need for manual intervention on uncoupling whilst preserving the properties of fluid-tightness in all circumstances.

GENERAL DESCRIPTION OF THE INVENTION

According to the invention therefore, there is provided a filling device which is constituted by two elements suitable for adaptation respectively to an opening of the reservoir and to the end of a liquid inlet pipe, which device is characterised by the fact that the first element comprises a rigid nozzle provided with a fixed annular seat and with a transverse support surface and a movable central valve member guide axially on this nozzle and capable of being pushed, against the effect of first elastic means, away from said seat and towards the inside of the reservoir, and wherein the second element comprises a rigid tubular body carrying a fixed value member which is rigidly fixed and arranged to push the movable valve member of the first element on coupling the two elements and on which are coaxially guided, on one hand, a movable annular seat, cooperating with the fixed valve member of the second element and urged by second elastic means which tend to thrust on this fixed valve member by outward movement and, on the other hand, an annular pusher urged by third elastic means which tend to move it outwardly, the movable annular seat being guided on the body with the inter-position of sealing means, and possessing other sealing means adapted to cooperate with the transverse surface of the rigid nozzle, the movable annular seat and pusher of the second element being adapted to cooperate by abutment with said transverse surface in such a way that, when the operator brings the second element towards the first by exerting a thrust thereon, there is caused, by contact of the rigid nozzle with said transverse surface, withdrawal of the annular pusher, then that of the movable annular seat (opening of the inlet pipe) accompanied by driving-in of the movable valve member (opening of the reservoir) by contact with the fixed valve member, interruption of said thrust automatically causing movements in the reverse direction under the effect of the assembly of abovementioned elastic means, that is to say the closing of the two seats by their respective valve members and the enforced separation of the two elements.

DETAILED DESCRIPTION

The invention will in any case be well-understood by means of the further description which follows and of the accompanying drawings, which description and drawings relate to a preferred embodiment and various modifications of the invention, but which are of course not to be considered as in any way limiting.

Figure 1:
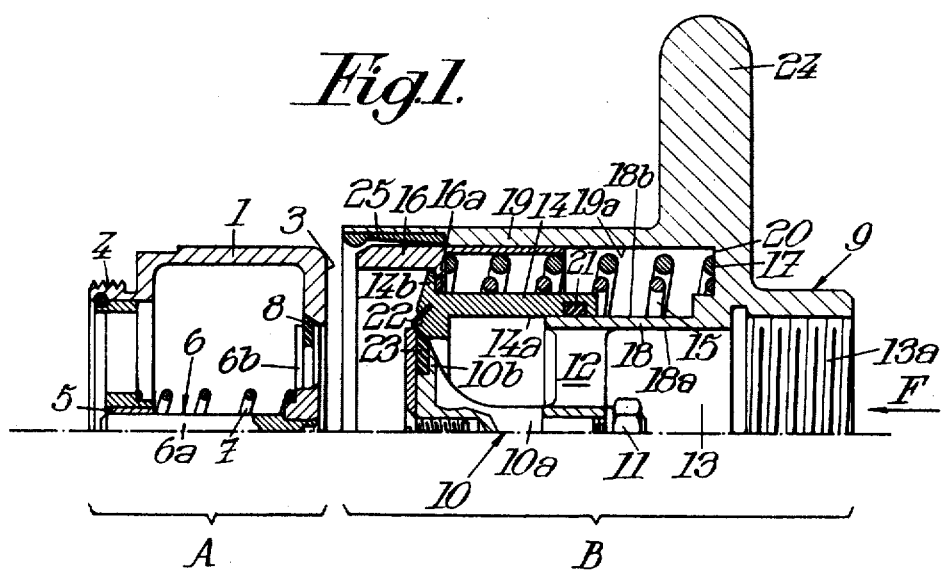
Figure 2:
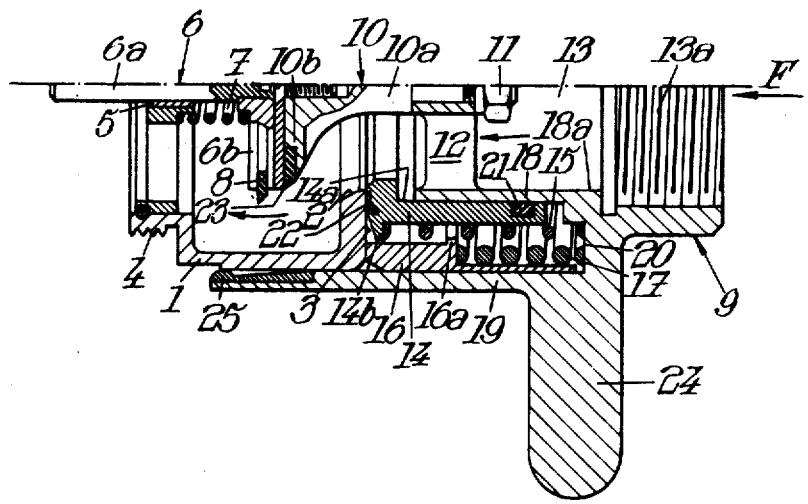

FIGS. 1 and 2 of these drawings, show, in axial half-section the two elements of one embodiment of a filling device constructed according to the invention, respectively in the uncoupling and coupling positions.

FIGS. 3 to 6, show in axial section various modifications of the embodiment of FIGS. 1 and 2.

As regards the filling device as a whole, it is constituted by two elements A and B (FIGS. 1 and 2) suitable for adaptation respectively to a tank filler opening and to the end of a delivery nozzle connected to a source of liquid under pressure.

The element A comprises a rigid nozzle 1 provided with a fixed annular seat 2, with a transverse support surface 3, a threaded collar 4 enabling adaptation of the element A to the reservoir (not shown) and an axial guide bush 5. The element A includes also a movable central valve 6 having a shank 6a which is engaged in the guide bush 5. This valve 6 is capable of being thrust (as will be explained below), against the effect of a spring 7 supported on the bush 5, towards the inside of the reservoir (that is to say towards the left in FIGS. 1 and 2), away from the seat 2 with which it cooperates normally by a head 6b provided with a sealing lining 8.

The element B comprises a rigid tubular body 9 with which afixed valve member 10 is rigidly fast arranged to push the movable valve 6 of the element A on coupling of the two elements A and B. The valve 10 is fixed by a shank 10a, by means of a nut 11, to ribs or arms 12 which are arranged radially inside a pipe 13 traversing the body 9 axially. The upstream portion 13a of the pipe 13 is internally threaded to enable connection of the element B to the liquid delivery pipe (not shown). The valve 10 possesses a head 10b whose outer diameter is slightly less than the inner diameter of the seat 2 of the element A.

On the body 9 are guided coaxially, on one hand, a movable annular seat 14 cooperating with the fixed valve 10 and urged by a spring 15 which tends to thrust on the head 10b of this valve 10 by outward movement (that is to say toward the left in FIGS. 1 and 2) and, on the other hand, an annular pusher 16 urged by a spring 17 which tends to move it outwardly. For this guidance, the body 9 has two coaxial cylindrical skirts 18 and 19. The innerskirt 18 limits, by its inner wall 18a, the pipe 13, and its outer wall 18b serves to guide an inner cylindrical wall 14a of the seat 14. The outer skirt 19 has an inner cylindrical wall 19a which serves to guide an outer cylindrical wall of the pusher 16. The two springs 15 and 17 are helicoidal springs which thrust, on one side, both on a bottom 20 of the body 9 which connects between them the skirts 18 and 19, and, on the other, respectively on shoulders of the seat 14 and of the pusher 16. An annular sealing joint 21 is mounted on the inner wall 14a of the seat 14 so as to prevent any leakage between the seat and the skirt 18 on any relative axial movement of these two elements.

The seat 14 and the pusher 16 have diameters such that they can both cooperate with the transverse surface 3 of the nozzle 1. The seat 14 bears an annular sealing joint 22 intended to come (see FIG. 2) into contact with this surface 3 in the coupling position. Another joint 23 is borne by the head 10b of the valve 10 in order to cooperate with a corresponding surface of the seat 14 which is placed downstream of the pipe 13.

To enable the operator to exert pressure in the direction of coupling (direction of the arrow F), the body 9 is provided with handles (or with a hand wheel) for manipulation 24. Although the movement of the seat 14 under the effect of the spring 15 is of course limited by the head 10b of the valve 10, that of the pusher 16 under the effect of the spring 17 can be limited by the valve 10, due to contact of a shoulder 14b provided on the seat 14 to serve for the thrust of the spring 15 against a shoulder 16a provided in the same way on the pusher 16 to serve as support for the spring 17.

The device can also be provided with means intended to facilitate the precentering and sliding of the element B on the element A. In the embodiment of FIGS. 1 and 2, these means are constituted by a ring 25 arranged internally at the free end of the outerskirt 19, formed of a material facilitating sliding (for example of bronze) and shaped so as to be adapted to the cylindrical outer surface of the nozzle 1, without the operator being obliged to take special precautions to present the element B to the element A.

Figure 3:
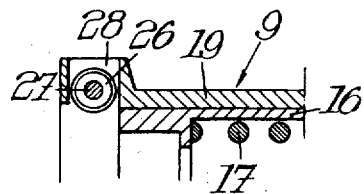

In a first modification shown in FIG. 3, the means intended to facilitate the precentering and sliding of the element B on the element A are constituted by rollers 26 arranged in radial planes and fixed by axles 27 in housings 28 provided at the free end of the skirt 19 of the body 9, so that these rollers can roll over the cylindrical outer surface of the nozzle 1. In a second modification shown in FIGS. 4 and 5, the abovesaid means are constituted by a recess 29 arranged internally at the free end of the pusher 16 with an inner diameter corresponding to the outer diameter of the cylindrical portion of the nozzle 1.

Figure 5:
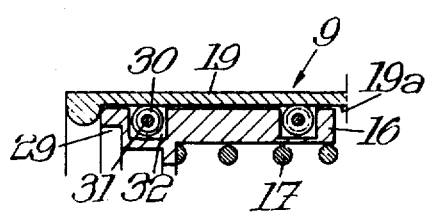

While in the embodiment of FIGS. 1 and 2, the sliding of the pusher 16 on the skirt 19 of the body 9 is effected with rubbing contact between sliding cylindrical surfaces such as 19a it is effected, in the modification of FIG. 5 with rolling contact between the inner cylindrical surface 19a of the skirt 19 and roller 30 arranged in radial planes and fixed by axles 31 in the recesses 32 which open on the outer wall of the pusher 16.

Figure 6:
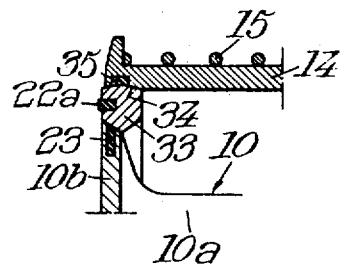

Finally, although in the embodiment of FIGS. 1 and 2, the joint 22 is mounted directly on the seat 14, an equivalent joint 22a is mounted, in the modification of FIG. 6, on the support 33, formed advantageously of plastics material, which can have the outer shape of a spherical ring and is placed in a hollow recess 34 having also the shape of a spherical ring of the same diameter as the preceding one and arranged internally in the free end of the seat 14, fluid-tightness between the support 33 of this seat being ensured by a joint 35. The whole is arranged so that the support 33 can rotate with respect to the seat 14 around the common center of the abovesaid spherical rings so that, on the presentation of the element B to the element A, the support 33 can take, with respect to the seat 14, the orientation which enables the joint 22 to be applied hermetically to the surface 3 of the nozzle 1.

MODE OF OPERATION OF THE INVENTION

Figure 4:
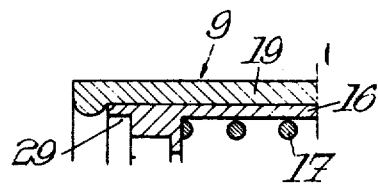

Whatever the embodiment adopted, there is obtained a filling device whose operation is as follows:

When the operator brings the element A close to the element B and exerts pressure in the direction of the arrow F in passing through the position of FIG. 1, the pusher 16 comes, in a first phase of the movement, into contact with the transverse surface 3 of the nozzle 1. This approach movement is facilitated by the ring 25 (FIGS. 1 and 2) the rollers (FIG. 3) or the housing 29 (FIGS. 4 and 5). In the course of the second phase, the pusher 16 retracts inside the skirt 19, against the effect of the spring 17. In a third phase, the movable seat 14 comes in turn in contact with the surface 3 and retracts against the effect of the spring 15 whilst the fixed valve 10 drives back the movable valve 6 against the effect of the spring 7.

This permits liquid, arriving through the pipe 13, to enter the reservoir by passing through the annular passages which are free, on one hand, between the seat 14 and the valve 10 and, on the other hand, between the seat 2 and the valve 6 and of which the cross-section increases on the advance of the element B (see the arrows symbolizing flow in FIG. 2). Any leakage is then prevented by the seals 21 and 22 or 22a.

To stop filling and for uncoupling, it suffices for the operator to release the manipulating handles 24. In a first phase, the concentric springs 15 and 17 exert in the reverse direction of arrow F, a force which has the effect of moving the body 9 to the right in FIGS. 1 and 2, which causes the closing of the passage 13 by the valve 10 and the seat 14. The fluid-tightness between the elements A and B remains ensured by the seal 22 or 22a until this closing.

Then, whilst the pusher 16 remains thrust against the surface 3 of the element A, the spring 17 exerts alone on the body 9 of the element B a force which is always directed in the reverse direction to force F and which causes the uncoupling of the element B with respect to the element A. At the same time, the spring 7 has caused the closing of the seat 2 of the element A by the valve 6.

In this way therefore, the operator has only to ensure that he exerts a thrust F as long as he wishes to continue filling. Then, it suffices for him to discontinue this thrust for the uncoupling operations to take place automatically without the possibility of loss of liquid.

As is self-evident, and as emerges already from the foregoing, the invention is in no way limited to those types of application and embodiments which have been particularly indicated; it encompasses on the contrary all modifications. In particular, the manipulating handles (or hand wheel) 24, instead of being formed of a single part with the body 9 in the manner shown in FIGS. 1 and 2, can be connected to the latter. In addition, if the material of which the body 9 is constituted permits, the ring 25 of FIGS. 1 and 2 can be eliminated without it being necessary to replace it by means such as those which have been described with reference to FIGS. 3 to 5. Lastly, the rollers 26 (FIG. 3) or 30 (FIG. 5) may be replaced by analogous roller members (balls, needles, etc.).

I claim:

1. Fluid-tight and separable coupling, liquid filling device for reservoirs, constituted by two elements suitable for adaptation respectively to an orifice of the reservoir and to the end of an inlet pipe for the liquid, the first element comprising a rigid nozzle provided with a fixed annular seat and with a transverse support surface and a central movable valve member guided axially on this nozzle and capable of being pushed, against the effect of first elastic means, away from said seat and towards the inside of the reservoir, and the second element comprising a rigid tubular body carrying a fixed valve member rigidly fixed, arranged to push the movable valve member of the first element on coupling of the two elements and on which is coaxially guided a movable annular seat, cooperating with the fixed valve member of the second element and urged by second elastic means which tend to thrust against this fixed valve member by outward movement, the movable annular seat being guided on the body with the interposition of sealing means and possessing other sealing means adapted to cooperate with the transverse surface of the rigid nozzle, and arranged to cooperate by abutment with said transverse surface, said device comprising an annular pusher provided in the second element, third elastic means guiding said annular pusher coaxially to the seat and urging it outwardly, said annular pusher being also adapted to cooperate by abutment with said transverse surface, so that, when an operator brings the second element axially towards the first by exerting sufficient thrust to overcome the force of the third elastic means, it causes successively, by direct contact of said transverse surface of the rigid nozzle with the annular pusher, the withdrawal of the latter then, by an additional movement, the withdrawal of the movable annular seat (opening of the inlet pipe) accompanied by the driving-in of the movable valve member (opening of the reservoir) by contact with the fixed valve member, the interruption of said thrust causing automatically movements in the reverse direction under the effect of the assembly of abovementioned elastic means, that is to say the closing of the two seats by their respective valve members and the enforced separation of the two elements.

2. Device according to claim 1, wherein the body of the second element has two coaxial cylindrical skirts, namely an inner skirt which defines, by its inner wall, an inlet pipe for liquid and whose outer wall serves to guide the seat, and an outer skirt which possesses an inner cylindrical wall serving to guide the pusher.

3. Device according to claim 2, wherein the elastic means acting respectively on the movable seat and on the pusher are coaxial helicoidal springs which, on one side, are both supported on the body and which on the other side, act respectively on shoulders of the movable seat and of the pusher.

4. Device according to claim 3, wherein the two shoulders are situated and arranged so that once the movable seat is stopped by the fixed valve member, they come into contact to limit the outward movement of the pusher.

5. Device according to claim 2, wherein the outer skirt bears internally, at its free end, a ring whose shape and inner dimensions are adapted to those of the nozzle of the first element, so as to facilitate the precentering and sliding of the second element on the first.

6. Device according to claim 2, wherein the outer skirt bears, at its free end, rollers or other rolling elements arranged in radial planes and intended to roll on the outer surface of the nozzle of the first element so as to facilitate the precentering and sliding of the second element on the first.

7. Device according to claim 2, wherein the pusher possesses, at its free end, an inner housing whose diameter corresponds to the outer diameter of the nozzle of the first element so as to facilitate the precentering and the sliding of the second element on the first.

8. Device according to claim 1, wherein the sealing means, which are provided on the movable seat to cooperate with the transverse surface of the nozzle of the first element, are mounted on this seat with, with respect to this seat and hence to the first element, a freedom which enables sealing on coupling of the two elements to be ensured, even though the latter are not strictly coaxial.

* * * * *